(12) United States Patent
Germano

(10) Patent No.: US 10,690,210 B2
(45) Date of Patent: Jun. 23, 2020

(54) MOUNT ASSEMBLY FOR A VEHICLE

(71) Applicant: GM Global Technology Operations LLC, Detroit, MI (US)

(72) Inventor: Francesco Germano, Turin (IT)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 15/971,036

(22) Filed: May 4, 2018

(65) Prior Publication Data
US 2019/0338822 A1 Nov. 7, 2019

(51) Int. Cl.
*F16F 9/30* (2006.01)
*B60K 5/12* (2006.01)

(52) U.S. Cl.
CPC ............ *F16F 9/306* (2013.01); *B60K 5/1208* (2013.01); *F16F 2228/008* (2013.01); *F16F 2234/02* (2013.01); *F16F 2234/04* (2013.01); *F16F 2238/02* (2013.01); *F16F 2238/04* (2013.01)

(58) Field of Classification Search
CPC .... F16F 1/54; F16F 3/10; F16F 3/0873; F16F 9/306; F16F 13/08; F16F 13/10; F16F 13/24; F16F 13/105; F16F 2230/0047; F16F 2228/008; F16F 2234/02; F16F 2238/02; F16F 2238/04; B60K 5/1208; B61F 5/02; Y10T 29/49622
USPC .......................................... 267/140.11, 141.2
See application file for complete search history.

(56) References Cited

U.S. PATENT DOCUMENTS

| | | | | |
|---|---|---|---|---|
| 2,660,387 A | * | 11/1953 | Nereus | F16F 1/3615 |
| | | | | 248/574 |
| 3,575,403 A | * | 4/1971 | Hamel | B61F 5/305 |
| | | | | 267/294 |
| 4,618,129 A | * | 10/1986 | Bechu | B60G 17/048 |
| | | | | 267/140.13 |
| 5,156,380 A | * | 10/1992 | Cerruti | F16F 7/108 |
| | | | | 188/378 |
| 5,582,394 A | * | 12/1996 | Bitschkus | F16F 1/377 |
| | | | | 267/140.13 |

FOREIGN PATENT DOCUMENTS

FR         2451511 A1    10/1980

\* cited by examiner

*Primary Examiner* — Robert A. Siconlfi
*Assistant Examiner* — San M Aung
(74) *Attorney, Agent, or Firm* — Quinn IP Law

(57) ABSTRACT

A mount assembly for a vehicle includes a housing having an upper mounting portion coupled to a first area of the vehicle and a lower mounting portion coupled to a second area of the vehicle. A dampening arrangement is disposed between the upper mounting portion and lower mounting portion. The dampening arrangement may include one or more biasing layers and one or more springs cooperating with the upper mounting portion and lower mounting portion. One or more relatively high viscoelastic layers are disposed adjacent to and cooperate with the one or more biasing layers. One or more relatively low viscoelastic layers are disposed adjacent and cooperate with the one or more relatively high viscoelastic layers. The one or more biasing layers, one or more relatively high viscoelastic layers, one or more relatively low viscoelastic layers and optional springs are configured to dissipate axial forces acting on the mount assembly.

9 Claims, 3 Drawing Sheets

MOUNT ASSEMBLY FOR A VEHICLE

TECHNICAL FIELD

The present disclosure relates generally to a mount assembly and, more particularly, to a mount assembly for a vehicle utilizing a multilayer dampening arrangement.

INTRODUCTION

Elastomeric powertrain mounting systems generally provide propulsion system isolation and control propulsion system motion. One common type of powertrain mount is an elastomeric powertrain mount that can provide constant dynamic properties across a range of frequencies. The level of damping is generally increased or decreased by preselecting an elastomeric material having different properties and/or dimensions. Once constructed, set damping rate characteristics are provided regardless of the actual operating conditions encountered by the mount.

SUMMARY

A vehicle includes a vehicle body defining a compartment and a powertrain received in the compartment. A mount assembly for securing the powertrain to the vehicle body includes a housing having an upper mounting portion coupled to a first area of the vehicle and a lower mounting portion coupled to a second area of the vehicle. A dampening arrangement is disposed between the upper mounting portion and lower mounting portion.

The dampening arrangement includes one or more biasing layers cooperating with the upper mounting portion and lower mounting portion. One or more relatively high viscoelastic layers or elastomeric layers are disposed adjacent to and cooperate with the one or more biasing layers. The one or more biasing layers may act as the skull of the mount assembly dampening arrangement and may be formed of steel, metal or the like. One or more relatively low viscoelastic layers are disposed adjacent and cooperate with the one or more relatively high viscoelastic layers.

The one or more relatively low viscoelastic layers may be formed to receive and at least partially enclose the one or more relatively high viscoelastic layers. The one or more biasing layers, one or more relatively high viscoelastic layers and one or more relatively low viscoelastic layers are configured to dissipate axial forces acting on the mount assembly. Each of the layers of dampening arrangement may have a distinct thickness along the axis in the direction of axial force acting on the mount assembly. Each of the one or more relatively high viscoelastic layers, the one or more relatively low viscoelastic layers and the one or more biasing layers may have different a distinct length or diameter relative perpendicularly to the axis in the direction of axial force acting on the mount assembly. Distinct thickness and distinct length of the one or more relatively high viscoelastic layers and the one or more relatively low viscoelastic layers produces different stiffness and different damping behavior and properties of each layer to dissipate axial forces and vibrations ranges.

In one non-limiting embodiment of the disclosure, the one or more biasing layers may include at least one spring having a first end received and secured to the upper mounting portion of the housing and a second end received and secured to the lower mounting portion of the housing. The upper mounting portion of the housing includes an annular rim that receives and secures the first end of the spring and the lower mounting portion includes an annular rim that receives and secures the second end of the spring. The housing, one or more biasing layers, at least one spring and annular rim may be formed of steel, metal or the like.

A first high viscoelastic layer is positioned in the annular rim on the upper mounting portion of the housing cooperating with the first end of the at least one spring and a second high viscoelastic layer positioned in the annular rim on the lower mounting portion of the housing cooperating with the second end of the at least one spring. The first and second high viscoelastic layers provide additional dampening for the at least one spring in the housing of the mount assembly. The upper mounting portion, lower mounting portion and at least one spring cooperate to define an inner periphery of the at least one spring sized to receive and cooperate with the dampening arrangement received therein.

The one or more relatively high viscoelastic layers and one or more relatively low viscoelastic layers of the dampening arrangement further include a first low viscoelastic layer positioned proximate the upper mounting portion, a first high viscoelastic layer at least partially covering the first low viscoelastic layer, a second low viscoelastic layer at least partially enclosing the first high viscoelastic layer and a second high viscoelastic layer at least partially covering the second low viscoelastic layer. The one or more relatively high viscoelastic layers and one or more relatively low viscoelastic layers of the dampening arrangement cooperate with the at least one spring to absorb low frequency and high frequency axial forces between the powertrain and the vehicle body. A member extends between the dampening arrangement and the lower mounting portion to position the dampening arrangement in the inner periphery of the at least one spring.

In another non-limiting embodiment of the disclosure, the housing of the mount assembly includes an upper mounting portion having a body including a first end including a flange positioned adjacent and coupled to the powertrain and a second end having one or more terminal edges and a lower mounting portion having a body including a first end including a flange positioned adjacent and coupled to the vehicle and a second end having one or more terminal edges. One or more coupling elements cooperate with the one or more terminal edges of the upper mounting portion and the lower mounting portion. The one or more coupling elements cooperate with the upper mounting portion and lower mounting portion to define an interior region of the housing sized to receive and at least partially enclose the dampening arrangement. The housing may be formed of metal or a low viscoelastic material. The housing and dampening arrangement may also be shaped in a cylindrical, cube, conical, pyramidal or other shape.

The one or more coupling elements may include a unitary seal engaging the one or more terminal edges of the upper mounting portion and the one or more terminal edges of the lower mounting portion and at least partially enclose the dampening arrangement in the housing. Alternatively, the one or more coupling elements may include a first seal disposed on the one or more terminal edges of the upper mounting portion and a second seal disposed on the one or more terminal edges of the lower mounting portion. The one or more terminal edges may be formed of a relatively low or relatively high viscoelastic material. The first seal and second seal cooperate to seal the interior region of the housing.

The one or more biasing layers of the dampening arrangement may include a plurality of metal inserts cooperating with the one or more relatively high viscoelastic layers and one or more relatively low viscoelastic layers to dampen axial forces acting on the mount assembly. One or more inserts may be positioned between adjacent low viscoelastic layers. The one or more inserts are formed of a high viscoelastic material to dampen axial forces between adjacent low viscoelastic layers.

In yet another embodiment of the disclosure, a mount assembly includes a housing having an upper mounting portion and a lower mounting portion. At least one spring includes a first end received and secured to the upper mounting portion of the housing and a second end received and secured to the lower mounting portion of the housing. The upper mounting portion, lower mounting portion and at least one spring cooperate to define an inner periphery.

A dampening arrangement is received within the inner periphery of the at least one spring and cooperates with the upper mounting portion and lower mounting portion of the housing. The dampening arrangement includes one or more relatively high viscoelastic layers disposed adjacent and cooperating with the at least one spring and one or more relatively low viscoelastic layers disposed adjacent and cooperating with the one or more relatively high viscoelastic layers. The one or more relatively low viscoelastic layers are formed to receive and at least partially enclose the one or more relatively high viscoelastic layers.

The at least one spring, one or more relatively high viscoelastic layers and one or more relatively low viscoelastic layers are configured to dissipate axial forces on the mount assembly. The at least one spring may be helicoidal, conical, cylinder or the like in shape. Each of the layers of dampening arrangement may have a distinct thickness along the axis in the direction of axial force acting on the mount assembly. Each of the one or more relatively high viscoelastic layers, the one or more relatively low viscoelastic layers and the one or more biasing layers may have different a distinct length or diameter relative perpendicularly to the axis in the direction of axial force acting on the mount assembly. Distinct thickness and distinct length of the one or more relatively high viscoelastic layers and the one or more relatively low viscoelastic layers produces different stiffness and different damping behavior and properties of each layer to dissipate axial forces and vibrations ranges.

The upper mounting portion of the housing includes an annular rim that receives and secures the first end of the at least one spring and the lower mounting portion includes an annular rim that receives and secures the second end of the at least one spring. A first high viscoelastic layer is positioned in the annular rim on the upper mounting portion of the housing cooperating with the first end of the at least one spring and a second high viscoelastic layer positioned in the annular rim on the lower mounting portion of the housing cooperating with the second end of the at least one spring.

The first and second high viscoelastic layers provide additional dampening for the at least one spring in the housing of the mount assembly. The upper mounting portion, lower mounting portion and at least one spring cooperate to define an inner periphery of the at least one spring sized to receive and cooperate with the dampening arrangement received therein.

The one or more relatively high viscoelastic layers and one or more relatively low viscoelastic layers of the dampening arrangement further include a first low viscoelastic layer positioned proximate the upper mounting portion, a first high viscoelastic layer at least partially covering the first low viscoelastic layer, a second low viscoelastic layer at least partially enclosing the first high viscoelastic layer and a second high viscoelastic layer at least partially covering the second low viscoelastic layer. The one or more relatively high viscoelastic layers and one or more relatively low viscoelastic layers of the dampening arrangement cooperate with the at least one spring to absorb low frequency and high frequency axial forces between the powertrain and the vehicle body.

In another non-limiting embodiment of the disclosure, a mount assembly includes a housing having an upper mounting portion including a body having a first end and a second end having one or more terminal edges and a lower mounting body having a first end and a second end having one or more terminal edges. One or more coupling elements cooperate with the one or more terminal edges of the upper mounting portion and the lower mounting portion. The one or more coupling elements cooperate with the upper mounting portion and lower mounting portion to define an interior region of the housing.

A dampening arrangement is disposed in the interior region of the housing. The dampening arrangement includes one or more biasing layers cooperating with the upper mounting portion and lower mounting portion of the housing, one or more relatively high viscoelastic layers disposed adjacent and cooperating with the one or more biasing layers, and one or more relatively low viscoelastic layers disposed adjacent and cooperating with the one or more relatively high viscoelastic layers.

The one or more relatively low viscoelastic layers are formed to receive and at least partially enclose the one or more relatively high viscoelastic layers. The one or more biasing layers include a plurality of metal inserts that cooperate with the one or more relatively high viscoelastic layers and one or more relatively low viscoelastic layers to dampen axial forces acting on the mount assembly.

Each of the layers of dampening arrangement may have a distinct thickness along the axis in the direction of axial force acting on the mount assembly. Each of the one or more relatively high viscoelastic layers, the one or more relatively low viscoelastic layers and the one or more biasing layers may have different a distinct length or diameter relative perpendicularly to the axis in the direction of axial force acting on the mount assembly. Distinct thickness and distinct length of the one or more relatively high viscoelastic layers and the one or more relatively low viscoelastic layers produces different stiffness and different damping behavior and properties of each layer to dissipate axial forces and vibrations ranges.

The one or more coupling elements may include a unitary seal engaging the one or more terminal edges of the upper mounting portion and the one or more terminal edges of the lower mounting portion and at least partially enclose the dampening arrangement in the housing. Alternatively, the one or more coupling elements may include a first seal disposed on the one or more terminal edges of the upper mounting portion and a second seal disposed on the one or more terminal edges of the lower mounting portion. The first seal and second seal cooperate to seal the interior region of the housing. One or more inserts may be positioned between adjacent low viscoelastic layers. The one or more inserts are formed of a high viscoelastic material to dampen axial forces between adjacent low viscoelastic layers.

Further areas of applicability will become apparent from the description provided herein. The description and specific examples in this summary are intended for purposes of illustration only and are not intended to limit the scope of the present disclosure. The above noted and other features and advantages of the present disclosure are readily apparent from the following detailed description when taken in connection with the accompanying drawings.

BRIEF DESCRIPTION OF THE DRAWINGS

The drawings described herein are for illustrative purposes only of selected embodiments and not all possible implementations, and are not intended to limit the scope of the present disclosure.

DETAILED DESCRIPTION

Figure 1:
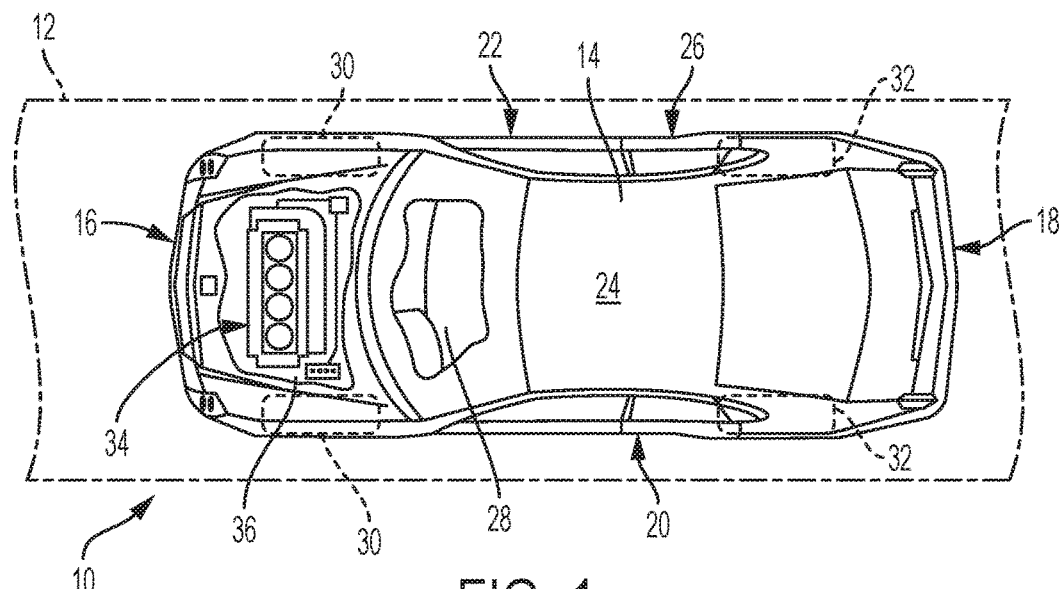
FIG. 1 is a schematic top view of a vehicle showing a partially sectioned hood panel and an under-hood compartment covered thereby, according to the disclosure.

Reference will now be made in detail to several embodiments of the disclosure that are illustrated in accompanying drawings. Whenever possible, the same or similar reference numerals are used in the drawings and the description to refer to the same or like parts or steps. The drawings are in simplified form and are not to precise scale. For purposes of convenience and clarity, directional terms such as top, bottom, left, right, up, over, above, below, beneath, rear, and front, may be used with respect to the drawings. These and similar directional terms are not to be construed to limit the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Referring to the drawings, wherein like reference numbers correspond to like or similar components throughout the several Figures, an example vehicle 10 is shown schematically in FIG. 1. The vehicle 10 may include, but not be limited to, a commercial vehicle, industrial vehicle, passenger vehicle, aircraft, watercraft, train or a mobile platform. It is also contemplated that the vehicle 10 may be a mobile platform, such as an airplane, all-terrain vehicle (ATV), boat, personal movement apparatus, robot and the like to accomplish the purposes of this disclosure.

The vehicle 10 in FIG. 1 is positioned relative to a road surface 12. The vehicle 10 includes a first end or front end 16, an opposing second end or rear end 18, a first lateral portion or left side 20 generally extending between the first and second ends 16, 18, and an opposing second lateral portion or right side 22. A vehicle body 14 further includes a top body portion 24, which may include at least a vehicle roof portion, and an opposing lower body portion or underbody 26. A passenger compartment 28 is defined in the vehicle body 14.

The vehicle 10 includes a frame (not shown) and one or more wheels 30, 32 arranged between the first and second vehicle body ends 16, 18, proximate the left and right sides 20, 22. The one or more wheels includes a first set of wheels 30 disposed proximate the first or front end 16 of the vehicle 10 and a second set of one or more wheels 32 disposed proximate the second or rear end 18 of the vehicle 10. As shown in FIG. 1, the first set of one or more wheels 30 includes a pair of front wheels that are rotatably connected to the vehicle 10 and rotate about an axis while the second set of one or more wheels 32 includes a pair of rear wheels that are rotatably connected to the vehicle 10 and rotate about an axis.

The vehicle 10 also includes a powertrain 34 that may include an internal combustion engine for generating engine torque. The powertrain 34 may also include a transmission (not shown) operatively connecting the engine to at least some of the road wheels 30, 32 for transmitting engine torque thereto and thereby put the vehicle 10 in motion. The powertrain 34 of the vehicle 10, if the vehicle is a hybrid type, may include one or more motor-generators, none of which are shown, but the existence of which can be appreciated by those skilled in the art. Efficiency of a vehicle powertrain 34 is generally influenced by its design, as well as by the various loads the powertrain 34 sees during its operation.

The vehicle body 14 defines a compartment 36 for housing the powertrain 34. However, it is understood that the compartment 36 may be configured as a storage compartment or other vehicle space if the powertrain 34 of the vehicle 10 is positioned in a central or rear portion of the vehicle 10.

The under-hood compartment 36 of the vehicle 10 may accept a number of alternative distinct powertrains 34. A specific powertrain 34 may be selected based on the intended use of the vehicle 10 or the general preference of the vehicle's user. Hence, although the physical size of the alternative powertrains 34, as well as the power output of the respective engines, may be vastly different, the overall size and layout of the particular under-hood compartment 36 remains relatively unchanged.

Figure 2:
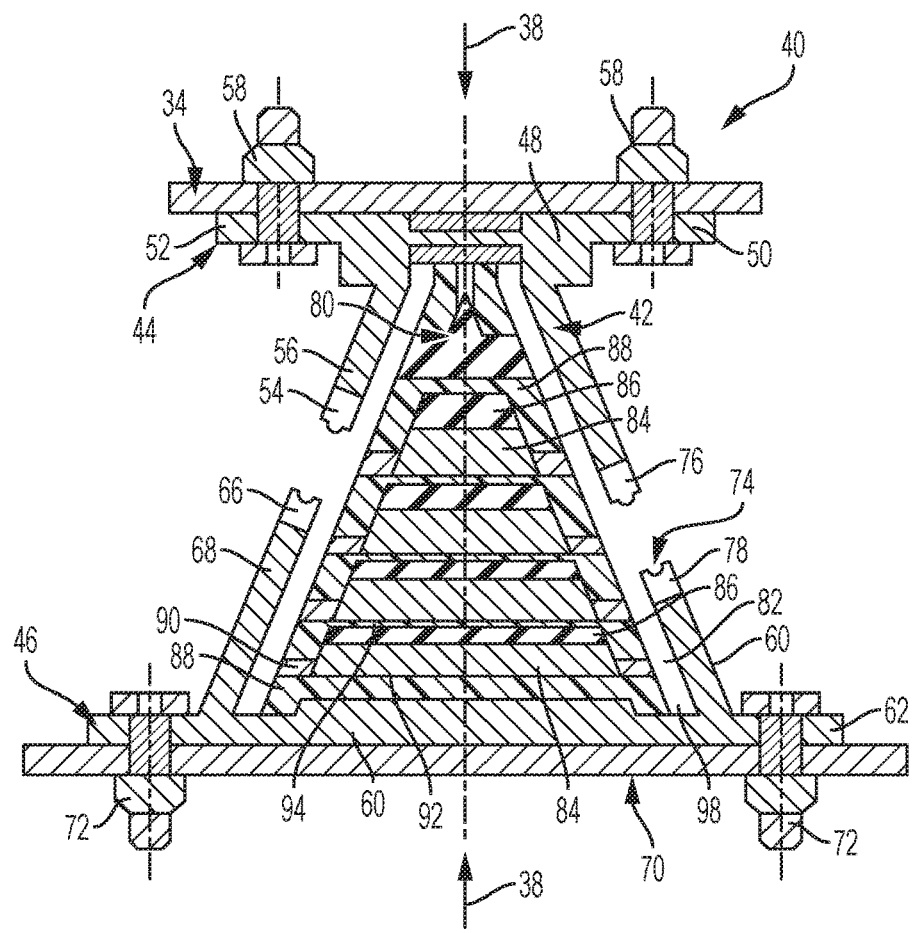
FIG. 2 is a schematic cross-sectional diagram of a first exemplary embodiment of a mount assembly for a vehicle in accordance with the disclosure.

Referring now to FIGS. 2, 3A-3B and 4A-4B, wherein like reference numbers correspond to like or similar components throughout the several figures, FIG. 2 illustrates a schematic cross-sectional diagram of a mount assembly for a vehicle. The mount assembly or mount 40 may be used with a propulsion system or powertrain in accordance with an exemplary embodiment of the disclosure. The propulsion system or powertrain may be one or more of an internal combustion engine, fuel cells, motors and the like as discussed above. It is also contemplated that the mount 40 may be used in other vehicle applications, such as engine mounts, seats and chassis and cockpit support, as well as non-vehicle applications, such as industrial machines, test equipment and the like.

The mount 40 may be configured to absorb and dissipate loads or axial forces acting along an axis defined generally by line and reference number 38. Mount 40 may include a housing 42 having a first or upper mounting portion 44 and a corresponding and cooperating second or lower mounting portion 46. It is contemplated that the terms upper and lower are utilized for reference purposes. The mount 40 may be utilized such that the upper mounting portion 44 may be transposed with the lower mounting portion 46 to accomplish the objectives of the disclosure.

The housing 42 may be formed as a unitary structure or, in the alternative, two or more structures as shown in FIG. 2. The upper mounting portion 44 of the housing 42 includes a body 48 having a first end 52 and a second end 56. A flange 50 is provided on the first end 52 that is positioned adjacent the powertrain 34 and may be coupled by fasteners 58 to the powertrain 34. The second end 56 of the body 48 may include one or more terminal edges 54.

The lower mounting portion 46 of the housing 42 includes a body 60 having a flange 62 disposed on a first end and one or more terminal edges 66 disposed on a second end 68. The flange 62 on the first end of the lower mounting portion 46 is positioned proximate a structure 70 of the vehicle 10, such as a vehicle chassis, frame, subframe, body, panel, cooperating structure or the like. The flange 62 may be fixedly coupled to the structure 70 with fasteners 72. The one or more terminal edges 54, 66 may be formed of a relatively low or relatively high viscoelastic material.

One or more coupling elements 74 cooperate with and are positioned between the terminal edges 54 of the upper mounting portion 44 and terminal edges 66 of lower mounting portion 46 of the housing 42. Coupling elements 74 may be formed as viscoelastic or elastomeric inserts that dampen and restrict movement between the upper mounting portion 44 and lower mounting portion 46 of the housing 42 to absorb axial forces along axis 38. The one or more coupling elements 74 engage the terminal edges 54 of the upper mounting portion 44 and the terminal edges 66 of the lower mounting portion 46 to define an interior region 82 of the housing 42 and at least partially enclose a dampening arrangement 80 in the interior region 82 of the housing 42.

In one non-limiting embodiment, the one or more coupling elements 74 may include a unitary element or seal that provides a seal to restrict entry of fluid, debris or other material into the interior region 82 of the housing 42. Alternatively, the one or more coupling elements 74 may include a first seal 76 disposed on the one or more terminal edges 54 of the upper mounting portion 44 and a second seal 78 disposed on the one or more terminal edges 66 of the lower mounting portion 56. The first and second seals 76, 78 may include a mating arrangement, such as male and female connectors or tongue and groove configuration, to seal the interior of the housing 42.

The upper mounting portion 44 and lower mounting portion 46 of the housing 42 may be formed or shaped to improve coupling between the portions 44, 46 and cooperate to absorb and dissipate axial forces along axis 38. For example, as is shown in FIG. 2, the upper mounting portion 44 and lower mounting portion 46 of the housing 42 are configured to create a frustoconical shaped mount 40. It is understood that a variety of shapes may be used to accomplish similar objectives, including, but not limited to, a pyramid, conical or cylindrical shaped housing. The housing 42 may be formed of one or more materials, such as plastic, a polymeric composite, steel or other metal.

The dampening arrangement 80 cooperates with the housing 42 of the mount 40 to absorb and dissipate axial forces along axis 38. The dampening arrangement 80 is sized to be received within the interior region 82 of the housing 42 of the mount 40. The dampening arrangement 80 may include a variety of configurations to accomplish the objectives of the disclosure. The housing 42 may be formed of metal or a low viscoelastic material. The housing 42 and dampening arrangement 80 may also be shaped in a cylindrical, cube, conical, pyramidal or other shape.

In one non-limiting embodiment, dampening arrangement 80 includes one or more armor layers or biasing layers 84, one or more relatively high viscoelastic layers 86 cooperating with the biasing layers 84 and one or more relatively low viscoelastic layers 88 cooperating with the biasing layer 84 and the high viscoelastic layer 86. The one or more biasing layers 84 may be metal layers and act as the skull of the mount assembly dampening arrangement and may be formed of steel, metal or the like or a relatively low viscoelastic plastic material with relatively high stiffness. The one or more biasing layers 84 may be formed as a helical, helicoidal, conical, cylindrical or other shape.

In this configuration, the at least one spring or biasing layers 84 exerts a force in response to loads or axial forces generated along axis 38 that may be proportional to the deformation of the spring, thereby absorbing low frequency loads or axial forces along axis 38. Alternatively, the one or more biasing layers 84 may be formed as multiple layers with a variety of shapes, such as an E-shape or an H-shape. The mount assembly 40 may also be formed of alternating viscoelastic and/or elastomeric material layers with metal layers.

For reference purposes, viscoelasticity is the property of materials that exhibit both viscous and elastic characteristics when undergoing deformation. Viscosity is a measure of the ability of a material to resist flow. Elasticity is a measure of the ability of a material to resume its normal shape after being stretched or compressed. Viscoelastic materials may be used in applications suited for noise dampening, isolation of vibration and/or shock absorption. Unlike elastic materials, viscoelastic materials dissipate energy when a load is applied to and removed from a material.

Viscoelastic material may possess distinct material property behaviors: elastic like a spring and damping/viscous like rubber and may also be referred to as viscoplastic. Elastomeric material, such as rubbers, may also have viscous damping behavior. The relatively high viscoelastic material is the softer material, with high viscosity/damper effect, while the relatively low viscoelastic material may be the harder and stiffer material, with low damping viscoelastic behavior.

Thus, for purposes of this application, a relatively high viscoelastic layer may be formed of a material that demonstrates improved viscoelastic properties with viscosity to dissipate forces when a load is applied and removed. A relatively low viscoelastic layer may be formed of a material that demonstrates diminished viscoelastic properties and higher elastic properties when a load is applied and then removed. The relatively high viscoelastic layer has improved viscoelastic properties when compared to the relatively low viscoelastic layer.

The one or more relatively high viscoelastic layers 86 may be formed of a material such as rubber, silicone, a viscoelastic polymer or the like. The one or more relatively high viscoelastic layers 86 incorporate increased elastomeric stiffness properties that support dampening of high frequency loads or axial forces along axis 38. As shown in FIG. 2, a high viscoelastic layer 86 is positioned proximate a biasing layer 84 and between adjacent multiple biasing layers 84.

As the at least one spring or biasing layers 84 absorb loads exerted against the mount 40 along axis 38, the one or more relatively high viscoelastic layers 86 cooperate with the biasing layers 84 to absorb high frequency loads or axial forces along axis 38. The inclusion of one or more relatively high viscoelastic layers 86 between the one or more biasing layers 84 allows the force the spring or layers 84 exerts in response to loads or axial forces along axis 38 to be increased as a polynomial function with a degree higher than one to the deformation of the spring, thereby absorbing both low frequency and high frequency loads as the layers 84, 86 of mount 40 is actuated in response to loads or axial forces along axis 38.

The one or more relatively low viscoelastic layers 88 may be formed of a thermoplastic material such as polyether ether ketone (PEEK) or the like. The one or more relatively low viscoelastic layers 88 are formed with a stiff structural matrix and are shaped to receive and cooperate a high viscoelastic layer 86 to dampen high frequency loads or axial forces along axis 38. The one or more relatively low viscoelastic layers 88 may further include or incorporate a graphite, glass fiber or the like to increase the structural stiffness of the layers 88.

As shown in FIG. 2, the relatively low viscoelastic layer 88 is positioned between a biasing layer 84 and a high viscoelastic layer 86. The one or more relatively low viscoelastic layers 88 are shaped to receive and support an adjacent high viscoelastic layer 86. The relatively low viscoelastic layer 88 at least partially surrounds the high viscoelastic layer 86 to support and retain the high viscoelastic layer 86 as the layer dampens high frequency loads exerted along axis 38. Each of the layers may have different thickness along the axial force direction 38 acting on the mount assembly 40. The mount assembly 40 may be conical or pyramidal in shape or the like in shape and all the layers may have different length or diameter, perpendicularly to the axial force direction 38 acting to the mount assembly 40. Further, distinct thickness and length of viscoelastic layers produce different stiffness and different damping behavior of each layer, and better dissipate axial forces and vibrations ranges.

The dampening arrangement 80 of the mount 40 shown in FIG. 2 will be described in greater detail. For purposes of clarity, the dampening arrangement 80 will be described starting from the lower mounting portion 46 of the housing 42 toward the upper mounting portion 44 of the housing 42. The terms above, below, upper, lower, top, bottom and the like are directional for purposes of this illustration. A frustoconically shaped body 60 of the lower mounting portion 46 of the housing 42 includes an inner region 82 sized to receive the dampening arrangement 80. In one non-limiting embodiment, the dampening arrangement 80 is conical in shape.

The dampening arrangement 80 includes a relatively low viscoelastic layer 88 positioned on a bottom inner surface of the lower mounting portion 46. A first low viscoelastic layer 88 receives and supports a biasing layer 84 thereon. The biasing layer 84 is positioned on the first low viscoelastic layer 88. Once positioned, the biasing layer 84 is sized to expose a portion of upper surface 92 of the first low viscoelastic layer 88. A high viscoelastic layer 86 is positioned on and above the biasing layer 84.

A second low viscoelastic layer 94 is positioned on an upper surface of the high viscoelastic layer 86. The second low viscoelastic layer 94 is formed with a generally planar surface and an annular shaped rim or lip 98 extending from the generally planar surface toward the first low viscoelastic layer 88. An inner portion of the generally planar surface and annular rim 98 of the second low viscoelastic layer 94 is sized to receive and support the high viscoelastic layer 86 and biasing layer 84 therebetween.

One or more inserts 90 formed of a high viscoelastic material are placed on the upper surface 92 of the first low viscoelastic layer 88 adjacent an exterior portion of the biasing layer 84. The one or more inserts 90 cooperate with the upper surface 92 first low viscoelastic layer 88 and annular rim 98 of the second low viscoelastic layer 94 to at least partially enclose the biasing layer 84 and the high viscoelastic layer 86. It is contemplated that one or more inserts 90 are formed of a high viscoelastic material and may be positioned between adjacent low viscoelastic layers to protect the one or more relatively low viscoelastic layers 88 and further dampen the high frequency loads as the mount 40 is actuated in response to loads or axial forces along axis 38.

The configuration of a biasing layer 84 and high viscoelastic layer 86 between low viscoelastic layers 88, 94 is repeated based upon the desired length of the dampening arrangement 80 into the upper mounting portion 44 of the housing 42 of the mount 40. A relatively low viscoelastic layer 88 may be placed as the top portion of the dampening arrangement 80 to engage the upper portion 44 of the housing 42. Alternatively, a first end of the one or more biasing layers 84 may engage the upper portion 44 of the housing 42. In another embodiment of the disclosure, the dampening arrangement 80 may include one or more biasing layers 84 formed as a spring at least partially immersed in one or more viscoelastic materials within the housing 42 without the use of the relatively high viscoelastic layer 86 and relatively low viscoelastic layer 88. The housing 42 and one or more biasing layers 84 may be formed of steel, metal or the like.

Each of the layers of dampening arrangement 80 may have a distinct thickness along the axis in the direction of axial force 38 acting on the mount assembly 40. Each of the one or more relatively high viscoelastic layers 86, the one or more relatively low viscoelastic layers 88 and the one or more biasing layers 84 may have different a distinct length or diameter relative perpendicularly to the axis in the direction of axial force 38 acting on the mount assembly 40. Distinct thickness and distinct length of the one or more relatively high viscoelastic layers 86 and the one or more relatively low viscoelastic layers 88 produces different stiffness and different damping behavior and properties of each layer to dissipate axial forces and vibrations ranges.

Figure 3A:
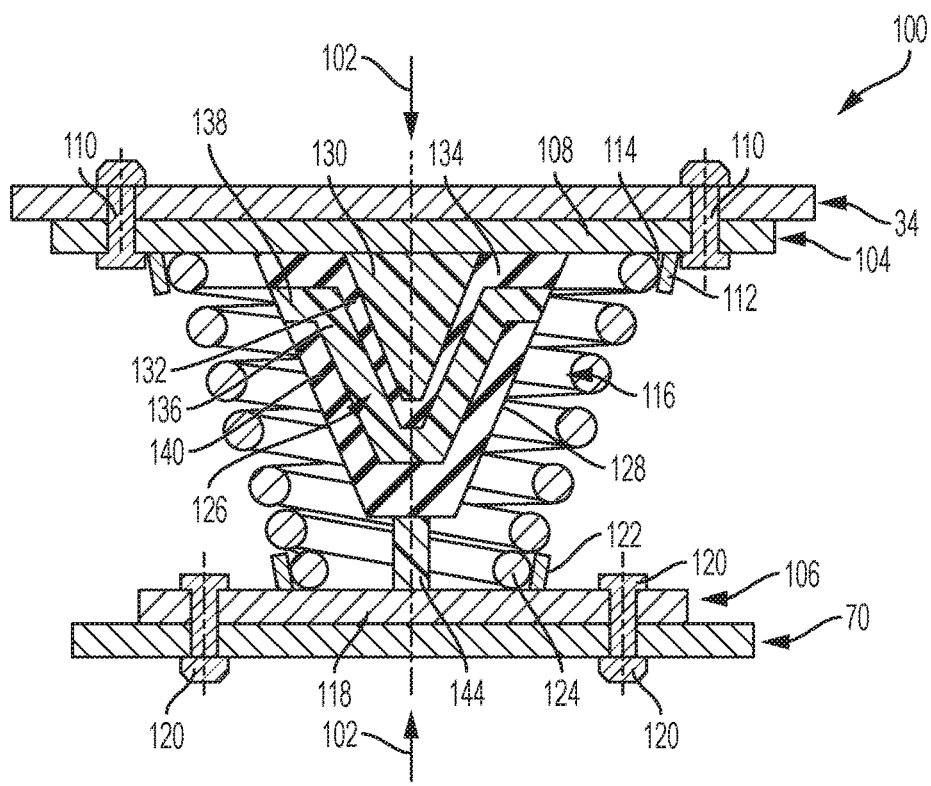
FIG. 3A is a schematic cross-sectional diagram of a second exemplary embodiment of a mount assembly for a vehicle.
Figure 3B:
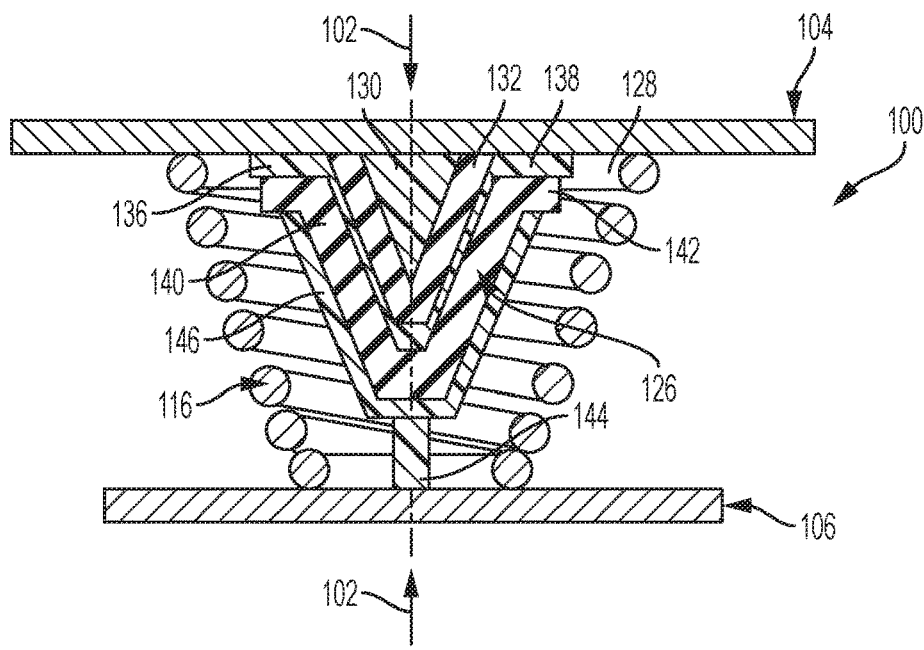
FIG. 3B is a schematic illustration of the operation of the second exemplary embodiment of the mount assembly.

Referring now to FIGS. 3A-3B, a second exemplary embodiment of a mounting arrangement for a vehicle is illustrated and disclosed. As with FIG. 2, the mount 100 absorbs and dissipates forces acting along an axis or axial forces defined generally by line and reference number 102. The mount includes a first portion or upper mounting portion 104 and a second portion or lower mounting portion 106. As described above, the terms upper and lower are utilized for reference purposes. The mount 100 may be disposed such that the upper mounting portion 104 may be transposed with the lower mounting portion 106 to accomplish the objectives of the disclosure.

The upper mounting portion 104 of the mount 100 includes a body 108 positioned adjacent the powertrain 34. The body 108 may be fixedly coupled by fasteners 110 to support the powertrain 34. The body 108 includes one or more projections or an annular rim 112 extending from the body 108 that are sized to receive and support a first end 114 of at least one spring 116. The spring 116 may be helicoidal in shape. Alternatively, the at least one spring may be conical, cylindrical or the like in shape.

The lower mounting portion 106 of the mount 100 includes a body 118 positioned adjacent the structure 70 of the vehicle 10. The body 118 may be fixedly coupled to the structure 70 by fasteners 120. The body 118 of the lower mounting portion 106 includes one or more projections or an annular rim 122 extending from the body 118 sized to receive and support a second end 124 of the spring 116. A housing or other cover (not shown) may be positioned over the spring 116 and extend between the upper mounting portion 104 and lower mounting portion 106 of the mount 100 to at least partially enclose the at least one spring 116 and dampening arrangement 126.

The dampening arrangement 126 of mount 100 is described in greater detail. Dampening arrangement 126 is disposed within an inner periphery 128 of the at least one spring 116. Dampening arrangement 126 includes one or more layers of viscoelastic materials to dampen high frequency loads or axial forces along axis 102 and support the at least one spring 116 in the dampening of low frequency loads or axial forces along axis 102.

The mount assembly 100 may include at least one spring 116 between the upper mounting portion 104 and the lower mounting portion 106 cooperating with the one or more relatively low viscoelastic layers, one or more relatively high viscoelastic layers and one or more biasing layers. The at least one spring 116 may be used in place of the one or more biasing layers and may be helicoidal, conical, cylindrical or the like in shape.

Each of the layers of the dampening arrangement 126 may have different thickness along the axis of the direction of axial force 102 acting to the mount assembly 100. Each of the one or more relatively high viscoelastic layers, the one or more relatively low viscoelastic layers and the one or more biasing layers may have a distinct length or diameter, acting perpendicularly to the axis of the direction of axial force 102 of the mount assembly 100. Different thickness and lengths of the one or more relatively high viscoelastic layers and the one or more low viscoelastic layers produce different stiffness and different damping behavior of each layer to dissipate axial forces and vibrations ranges.

Referring to FIG. 3A, the dampening arrangement 126 includes a first low viscoelastic layer 130 positioned proximate the upper mounting portion 104. In one non-limiting embodiment, the first low viscoelastic layer 130 is generally V-shaped. A first high viscoelastic layer 132 is positioned proximate and at least partially covers or encloses the first low viscoelastic layer 130.

The first high viscoelastic layer 132 covers an outer portion of the V-shaped first low viscoelastic layer 130. The first high viscoelastic layer 132 further includes an annular extending rim 134 that is positioned proximate to and engages the upper mounting portion 104 of the mount 100. The rim 134 further extends adjacent a portion of the inner periphery 128 of the at least one spring 116. The first low viscoelastic layer 130 provides a structural stiffness matrix for the first high viscoelastic layer 132. Alternatively, as is shown in FIG. 3B, the first high viscoelastic layer 132 may cover the first low viscoelastic layer 130 without the annular rim.

A second low viscoelastic layer 136 is positioned proximate to and formed to receive and at least partially enclose an outer portion of the first high viscoelastic layer 132. The second low viscoelastic layer 136 is formed with an annular rim 138 that positions and retains the rim 134 of the first high viscoelastic layer 132 adjacent the spring 116 and upper mounting portion 104 of the mount 100. Alternatively, as is shown in FIG. 3B, the annular rim 138 of the second low viscoelastic layer 136 may be positioned proximate to and engages the upper mounting portion 104 of the mount 100.

It is contemplated that the one or more relatively low viscoelastic layers 130, 136 may be formed of distinct thermoplastic materials. For example, the first low viscoelastic layer 130 may be formed of polyether ether ketone with a percentage of graphite or glass fiber while the second low viscoelastic layer 136 may be formed with a higher polyether ether ketone and a higher percentage of graphite or glass fiber for greater structural stiffness to support the first high viscoelastic layer 132.

A second high viscoelastic layer 140 covers an outer portion of the second low viscoelastic layer 136. The second high viscoelastic layer 140 is positioned proximate to and engages the annular rim 138 of the second low viscoelastic layer 136 and further extends adjacent a portion of the inner periphery 128 of the at least one spring 116. The second high viscoelastic layer 140 cooperates with a member 144 to position and support the dampening arrangement 126 within the inner periphery 128 of the at least one spring 116. The member 144 extends between the second high viscoelastic layer 140 and the lower mounting portion 106 to position the dampening arrangement 126. The housing 42, one or more biasing layers 84, at least one spring 116 and annular rim 134, 138 may be formed of steel, metal or the like.

Referring to an alternative configuration in FIG. 3B, the second high viscoelastic layer 140 further includes an annular extending rim 142 that is positioned proximate to and engages the annular rim 138 of the second low viscoelastic layer 136 and further extends adjacent a portion of the inner periphery 128 of the spring 116. A third low viscoelastic layer 146 covers the rim 142 of the second high viscoelastic layer 140. The third low viscoelastic layer 146 further includes a member 144 extending to the lower mounting portion 106 to position and support the dampening arrangement 126 within the inner periphery 128 of the at least one spring 116.

Figure 4A:
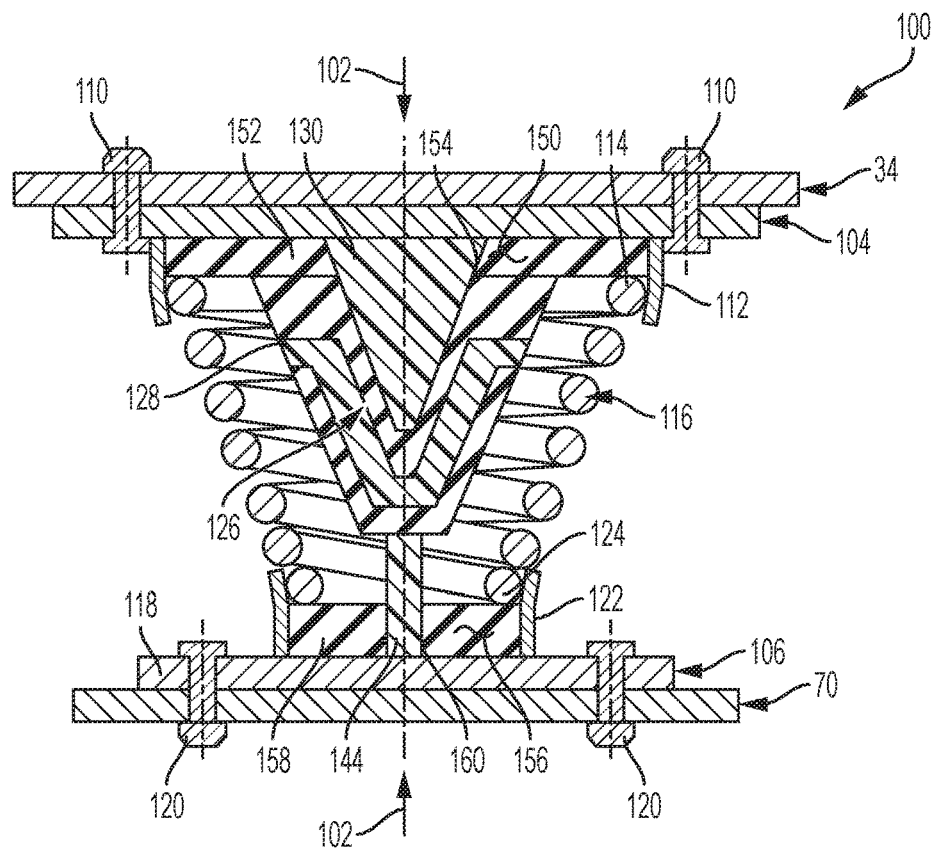
FIG. 4A is a schematic cross-sectional diagram of a third exemplary embodiment of a mount assembly for a vehicle.
Figure 4B:
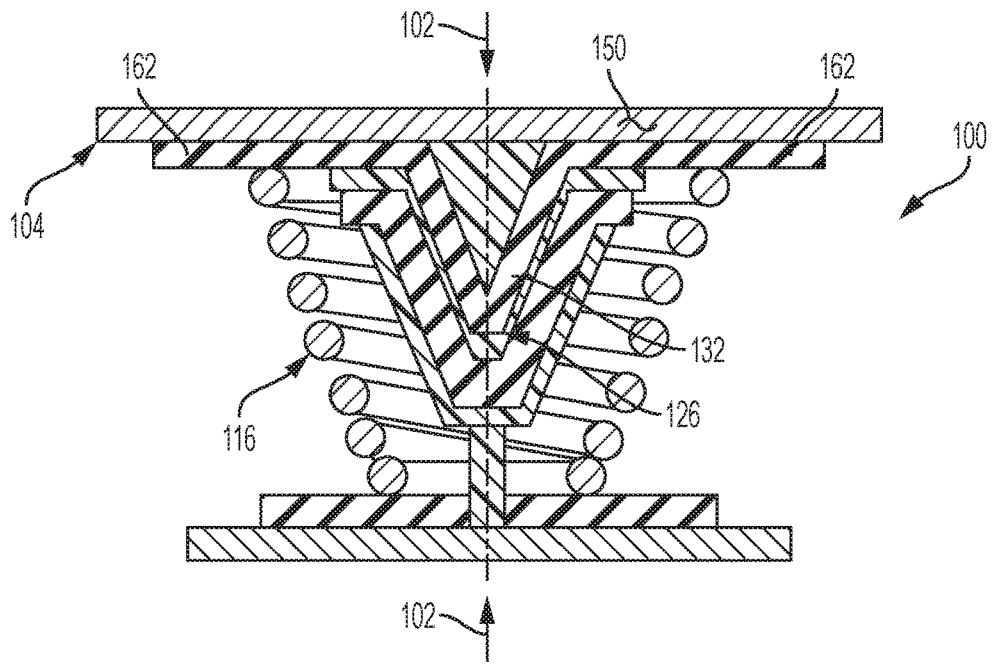
FIG. 4B is a schematic illustration of the operation of the third exemplary embodiment of the mount assembly in accordance with the disclosure.

Referring now to FIGS. 4A-4B, a third exemplary embodiment of the mounting assembly is illustrated and disclosed. The embodiment disclosed in FIGS. 4A-4B is a variation of the mount 100 illustrated in FIGS. 3A-3B. Reference numbers common to FIGS. 3A-3B will be used for FIGS. 4A-4B. The mount 100 illustrated in FIGS. 4A-4B utilizes additional viscoelastic layers in combination with the at least one spring 116 and dampening arrangement 126 to dampen low frequency and high frequency loads as the mount 100 is actuated in response to loads or axial forces generated along axis 102.

The mount 100 illustrated in FIGS. 4A-4B includes a first portion or upper mounting portion 104 and a second portion or lower mounting portion 106. The upper mounting portion 104 of the mount 100 includes a body 108 positioned adjacent the powertrain 34 and may be fixedly coupled by fasteners 110 to support the powertrain 34. The body 108 includes one or more projections or an annular rim 112 extending from the body 108. The annular rim 112 defines spring receiving area 150 in the body 108.

A first high viscoelastic layer 152 is positioned in the spring receiving area 150 of the body 108. The annular rim 112 is sized to receive and support the first end 114 of the at least one spring 116 and the first high viscoelastic layer 152. The first high viscoelastic layer 152 cooperates with the at least one spring 116 to provide dampening for high frequency loads as the mount 100 is actuated in response to loads or axial forces along axis 102. In one non-limiting embodiment, the first high viscoelastic layer 152 may include a channel 154 sized to receive and cooperate with the first low viscoelastic layer 130 extending from the body 108 of the upper mounting portion 104 of the mount 100.

The lower mounting portion 106 of the mount 100 includes a body 118 positioned adjacent the structure 70 of the vehicle 10. The body 118 of the lower mounting portion 106 includes one or more projections or an annular rim 122 extending from the body 118 sized to receive and support a second end 124 of the at least one spring 116. The annular rim 122 defines spring receiving area 156 in the body 118.

A second high viscoelastic layer 158 is positioned in the spring receiving area 156 of the body 118 of the lower mounting portion 106 of the mount 100. The annular rim 122 is sized to receive and support the second end 124 of the at least one spring 116. The second high viscoelastic layer 158 cooperates with the first high viscoelastic layer 152 in the upper mounting portion 104 and the at least one spring 116 to provide dampening for the at least one spring 116 for high frequency loads as the mount 100 is actuated in response to loads or axial forces along axis 102. In one non-limiting embodiment, the second high viscoelastic layer 158 may include a channel 160 sized to receive the member 144 extending between the dampening arrangement 126 and the lower mounting portion 106 to position the dampening arrangement 126 in the inner periphery 128 of the at least one spring 116.

Referring to an alternative configuration in FIG. 4B, the first high viscoelastic layer 132 of the dampening arrangement 126 includes a projection 162 that extends to the spring receiving area 150 in the upper mounting portion 104. The projection 162 of the first high viscoelastic layer 132 replaces the high viscoelastic layer 152 in FIG. 4A to support the at least one spring 116 to provide dampening for high frequency loads as the mount 100 is actuated in response to loads or axial forces generated along axis 102.

As with FIG. 4A, the alternative configuration of FIG. 4B the mount assembly 100 may include at least one spring 116 between the upper mounting portion 104 and the lower mounting portion 106 cooperating with the one or more relatively low viscoelastic layers, one or more relatively high viscoelastic layers and one or more biasing layers. The at least one spring 116 may be used in place of the one or more biasing layers and may be helicoidal, conical, cylindrical or the like in shape.

Each of the layers of the dampening arrangement 126 may have different thickness along the axis of the direction of axial force 102 acting to the mount assembly 100. Each of the one or more relatively high viscoelastic layers, the one or more relatively low viscoelastic layers and the one or more biasing layers may have a distinct length or diameter, acting perpendicularly to the axis of the direction of axial force 102 of the mount assembly 100. Different thickness and lengths of the one or more relatively high viscoelastic layers and the one or more low viscoelastic layers produce different stiffness and different damping behavior of each layer to dissipate axial forces and vibrations ranges.

The detailed description and the drawings or figures are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

The invention claimed is:

1. A vehicle comprising:
a vehicle body defining a compartment;
a powertrain received in the compartment; and
a mount assembly for securing the powertrain to the vehicle body, the mount assembly including a housing having:
an upper mounting portion of the housing, the upper mounting portion including a body having a first end including a flange positioned adjacent and coupled to the powertrain and a second end having one or more terminal edges,
a lower mounting portion of the housing, the lower mounting portion including a body having a first end including a flange positioned adjacent and coupled to the vehicle body and a second end having one or more terminal edges, and
one or more coupling elements cooperating with the one or more terminal edges of the second end of the upper mounting portion and the second end of the lower mounting portion,
wherein the one or more coupling elements cooperate with the upper mounting portion and lower mounting portion to define an interior region of the housing sized to receive and at least partially enclose a dampening arrangement disposed between the upper mounting portion and lower mounting portion;
wherein the dampening arrangement includes:
one or more biasing layers cooperating with the upper mounting portion and lower mounting portion,
one or more relatively high viscoelastic layers disposed adjacent and cooperating with the one or more biasing layers, and
one or more relatively low viscoelastic layers disposed adjacent and cooperating with the one or more relatively high viscoelastic layers, wherein the one or more relatively low viscoelastic layers are formed to receive and at least partially enclose the one or more relatively high viscoelastic layers,
wherein the one or more biasing layers, one or more relatively high viscoelastic layers and one or more relatively low viscoelastic layers are configured to dissipate axial forces on the mount assembly.

2. The vehicle of claim 1 wherein the one or more coupling elements further comprise a unitary seal engaging the one or more terminal edges of the upper mounting portion and the one or more terminal edges of the lower mounting portion and at least partially enclose the dampening arrangement in the housing.

3. The vehicle of claim 1 wherein the one or more coupling elements further comprises a first seal disposed on the one or more terminal edges of the upper mounting portion and a second seal disposed on the one or more terminal edges of the lower mounting portion, wherein the first seal and second seal cooperate to seal the interior region of the housing.

4. The vehicle of claim 1 wherein the one or more biasing layers further comprises a plurality of metal inserts cooperating with the one or more relatively high viscoelastic layers and one or more relatively low viscoelastic layers to dampen axial forces acting on the mount assembly.

5. The vehicle of claim 1 wherein the dampening arrangement further comprises one or more inserts positioned between adjacent low viscoelastic layers, wherein the one or more inserts are formed of a high viscoelastic material to dampen axial forces between adjacent low viscoelastic layers.

6. A mount assembly comprising:
a housing having an upper mounting portion including a body having a first end and a second end having one or more terminal edges and a lower mounting a body having a first end and a second end having one or more terminal edges;
one or more coupling elements cooperating with the one or more terminal edges of the upper mounting portion and the lower mounting portion, wherein the one or more coupling elements cooperate with the upper mounting portion and lower mounting portion to define an interior region of the housing;
a dampening arrangement disposed in the interior region of the housing, wherein the dampening arrangement includes:
one or more biasing layers cooperating with the upper mounting portion and lower mounting portion of the housing,
one or more relatively high viscoelastic layers disposed adjacent and cooperating with the one or more biasing layers, and
one or more relatively low viscoelastic layers disposed adjacent and cooperating with the one or more relatively high viscoelastic layers, wherein the one or more relatively low viscoelastic layers are formed to receive and at least partially enclose the one or more relatively high viscoelastic layers,
wherein the one or more biasing layers include a plurality of metal inserts cooperating with the one or more relatively high viscoelastic layers and one or more relatively low viscoelastic layers to dampen axial forces acting on the mount assembly.

7. The mount assembly of claim 6 wherein the one or more coupling elements further comprise a unitary seal engaging the one or more terminal edges of the upper mounting portion and the one or more terminal edges of the lower mounting portion and at least partially enclose the dampening arrangement in the housing.

8. The mount assembly of claim 6 wherein the one or more coupling elements further comprises a first seal disposed on the one or more terminal edges of the upper mounting portion and a second seal disposed on the one or more terminal edges of the lower mounting portion, wherein the first seal and second seal cooperate to seal the interior region of the housing.

9. The mount assembly of claim 6 wherein the dampening arrangement further comprises one or more inserts positioned between adjacent low viscoelastic layers, wherein the one or more inserts are formed of a high viscoelastic material to dampen axial forces between adjacent low viscoelastic layers.

* * * * *